(12) United States Patent
Wisler et al.

(10) Patent No.: US 7,008,135 B2
(45) Date of Patent: Mar. 7, 2006

(54) STAMPED BALL SOCKET

(75) Inventors: Jan A. Wisler, Anderson, IN (US);
Paul D. VanDuyn, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 24 days.

(21) Appl. No.: 10/124,899

(22) Filed: Apr. 18, 2002

(65) Prior Publication Data
US 2003/0143019 A1 Jul. 31, 2003

Related U.S. Application Data

(60) Provisional application No. 60/353,974, filed on Jan. 31, 2002.

(51) Int. Cl.
*F16C 11/00* (2006.01)
*F21V 19/02* (2006.01)

(52) U.S. Cl. ............... 403/122; 403/142; 403/143; 362/528; 362/421

(58) Field of Classification Search ............ 403/56, 403/76, 90, 114, 115, 122, 127, 131, 124, 403/125, 126, 142, 143; 362/507, 528, 549, 362/515, 421; 16/DIG. 26
See application file for complete search history.

(56) References Cited

U.S. PATENT DOCUMENTS

| | | | |
|---|---|---|---|
| 3,724,150 A * | 4/1973 | Hudnall | |
| 3,856,422 A | 12/1974 | Trefry | |
| 4,318,161 A * | 3/1982 | Shanks | 362/528 |
| 4,712,940 A | 12/1987 | Wood, Jr. | |
| 4,768,895 A * | 9/1988 | Ludwig et al. | 403/122 |
| 4,780,097 A | 10/1988 | Piscitelli | |
| 4,797,019 A | 1/1989 | Wood, Jr. | |
| 4,849,860 A | 7/1989 | Schauwecker | |
| 4,898,490 A | 2/1990 | Herbermann et al. | |
| 5,112,153 A | 5/1992 | Gunn et al. | |
| 5,154,530 A | 10/1992 | Dresselhouse | |
| 5,163,769 A | 11/1992 | Dresselhouse | |
| 5,186,532 A * | 2/1993 | Ryder et al. | 362/528 |
| 5,258,894 A | 11/1993 | Bivens | |
| 5,365,415 A | 11/1994 | Schmitt et al. | |
| 5,381,317 A | 1/1995 | Schmitt et al. | |
| 5,580,204 A | 12/1996 | Hultman | |
| 5,653,548 A * | 8/1997 | Amdahl | 403/122 |
| 5,678,947 A | 10/1997 | Urbach et al. | |
| 5,697,723 A | 12/1997 | Wood | |
| 5,993,033 A * | 11/1999 | Sugimoto et al. | 362/515 |
| 6,231,220 B1 * | 5/2001 | Shibuya et al. | 362/421 |
| 6,345,905 B1 * | 2/2002 | Kibayashi et al. | 362/528 |

* cited by examiner

*Primary Examiner*—Daniel P. Stodola
*Assistant Examiner*—Victor MacArthur
(74) *Attorney, Agent, or Firm*—Ice Miller

(57) ABSTRACT

A stamped ball socket for attaching a headlamp pod to a mounting bracket comprising a base having an opening which is adapted to accept a fastener. The ball socket further comprising at least two walls extending from the base and at least two lock-in fingers protruding at an angle from the walls. The lock-in fingers and the walls of the ball socket flex to allow a pivot ball to be inserted between the lock-in fingers such that when the pivot ball is fully inserted it is adjustably retained in the ball socket by the lock-in fingers. Additionally, the base, walls, and lock-in fingers of the present invention are integrally formed by stamping a single piece of metal.

15 Claims, 7 Drawing Sheets

STAMPED BALL SOCKET

CROSS REFERENCE TO RELATED APPLICATION

This application claims the benefit of U.S. Provisional Application No. 60/353,974, filed Jan. 31, 2002.

BACKGROUND OF THE INVENTION

The present invention relates generally to automotive lamps. More specifically, the present invention relates to ball sockets securing automotive headlamps.

Generally, automotive headlamp designs include a headlamp pod and a mechanism for mounting the headlamp pod to the rest of the automobile structure. The headlamp assembly usually consists of at least three basic parts. First, there is the light source itself which provides the illumination. This source is enclosed by the headlamp pod which contains a concave reflective surface that focuses the light toward the front of the automobile. There is also a translucent lens which allows the light to pass through but protects the light source from the elements. This entire headlamp pod must be attached to the rest of the automobile.

There are several qualities that are desirable in the attachment of the headlamp pod to the rest of the automobile structure. First, it is desirable for the attachment to be secure once the headlamp pod is mounted to the automobile. This is important considering the continuous vibration that an automobile endures as it travels. Over time this vibration could cause the headlamp to become loose or even detach from the automobile, potentially causing a severe accident. Second, it is desirable in manufacturing for the attachment to require minimum force to attach the headlamp pod to the mounting bracket. Minimum force to attach the headlamp pod is desirable because such an attachment would exert minimum stress on the components of the assembly minimizing the chance of premature failure due to weakening of the components. Third, it is desirable for the attachment to allow the pivoting of the headlamp pod to aim the resulting light beams. This allows the headlamp to be adjusted to properly illuminate the surface of the road and the space in front of the vehicle.

Commonly, assemblies used to attach headlamp pods to automobiles employ a mounting bracket firmly attached to the automobile. These mounting brackets are then fit with a number (usually two or three) of posts which each terminate in an adjuster pivot ball. A headlamp pod is fitted with corresponding ball sockets which mate with the pivot balls, thereby attaching the pod by two or three pivot points to the mounting bracket. Currently, there are numerous ball socket designs, most of which are molded of nylon. These designs vary from one-piece to three-piece constructions. In addition to designs using only nylon, other current designs employ combinations of nylon and a steel bracket.

Some of the current molded designs allow the ball to be snapped into the socket in one assembly motion. This is a desirable design feature that makes assembly more efficient. These designs typically employ a one-piece construction using molded nylon. However, because of the die lock molding process employed in their manufacture these designs must be forced from their mold core. This process limits the resulting molded ball socket's ability to hold the ball in place and prevent disengagement.

Thus, a need exists for a ball socket which can be manufactured inexpensively and which allows the ball to be mated to the socket in one, relatively simple assembly motion. Additionally, the ball socket must not suffer from the lack of retention strength of current molded one-piece ball sockets.

BRIEF SUMMARY OF THE INVENTION

The present invention provides for a ball socket design comprising a single metal piece stamped to form a ball socket for attaching headlamp pods securely to a mounting bracket on an automobile. The present invention pivotably attaches a headlamp pod to a mounting bracket having one or more adjuster pivot balls. In particular, the stamped ball socket of the present invention is pivotably attached to the headlamp pod by utilizing a fastener, such as, for example, an attachment screw, inserted through an attachment hole and into the headlamp pod. The mounting bracket is then attached by inserting the adjuster pivot ball into the stamped ball socket. However, the present invention may also be utilized to connect a headlamp pod with an adjuster pivot ball to a mounting bracket without an adjuster pivot ball simply by securing the stamped ball socket to the mounting bracket utilizing a fastener inserted through the attachment hole. The adjuster pivot ball is then inserted into the stamped ball socket to secure the headlamp pod.

The ball socket of the present invention comprises a base having an opening which is adapted to accept a fastener. The fastener is inserted through the opening and engages the headlamp pod to fixedly secure the ball socket to the headlamp pod. The ball socket further comprises at least two walls extending from the base and at least two lock-in fingers protruding at an angle from the walls. The lock-in fingers and the walls of the ball socket of the present invention flex to allow a pivot ball to be inserted between the lock-in fingers such that when the pivot ball is fully inserted it is adjustably retained in the ball socket by the lock-in fingers. In addition, the base, walls, and lock-in fingers of the present invention are integrally formed by stamping a single piece of metal.

While many embodiments of the present invention are possible and intended to fall within the scope of the claims appended hereto, three exemplary embodiments are described herein. The first exemplary embodiment comprises four walls, with each wall having an angled lead-in tab at one end. Extending from the four lead-in tabs are four lock-in fingers which project into the stamped ball socket at the same angle as the angled lead-in tabs. The second exemplary embodiment comprises two walls, which are wider than the walls in the first exemplary embodiment. Again, each wall is bent outwards and terminates in an angled lead-in tab and also further comprises lock-in fingers. Extending from the other two sides are sidewalls, which are shorter than the other two walls. Finally, the third exemplary embodiment comprises two walls, each with lock-in fingers. The lock-in fingers of this exemplary embodiment have an arcuate edge surface which, along with the upper portion of the wall, is folded inwards at an angle. Each embodiment allows an adjuster pivot ball to be snapped into the ball socket in one assembly motion, with the adjuster pivot ball then pivotably secured to the ball socket.

DETAILED DESCRIPTION OF THE INVENTION

Figure 1:
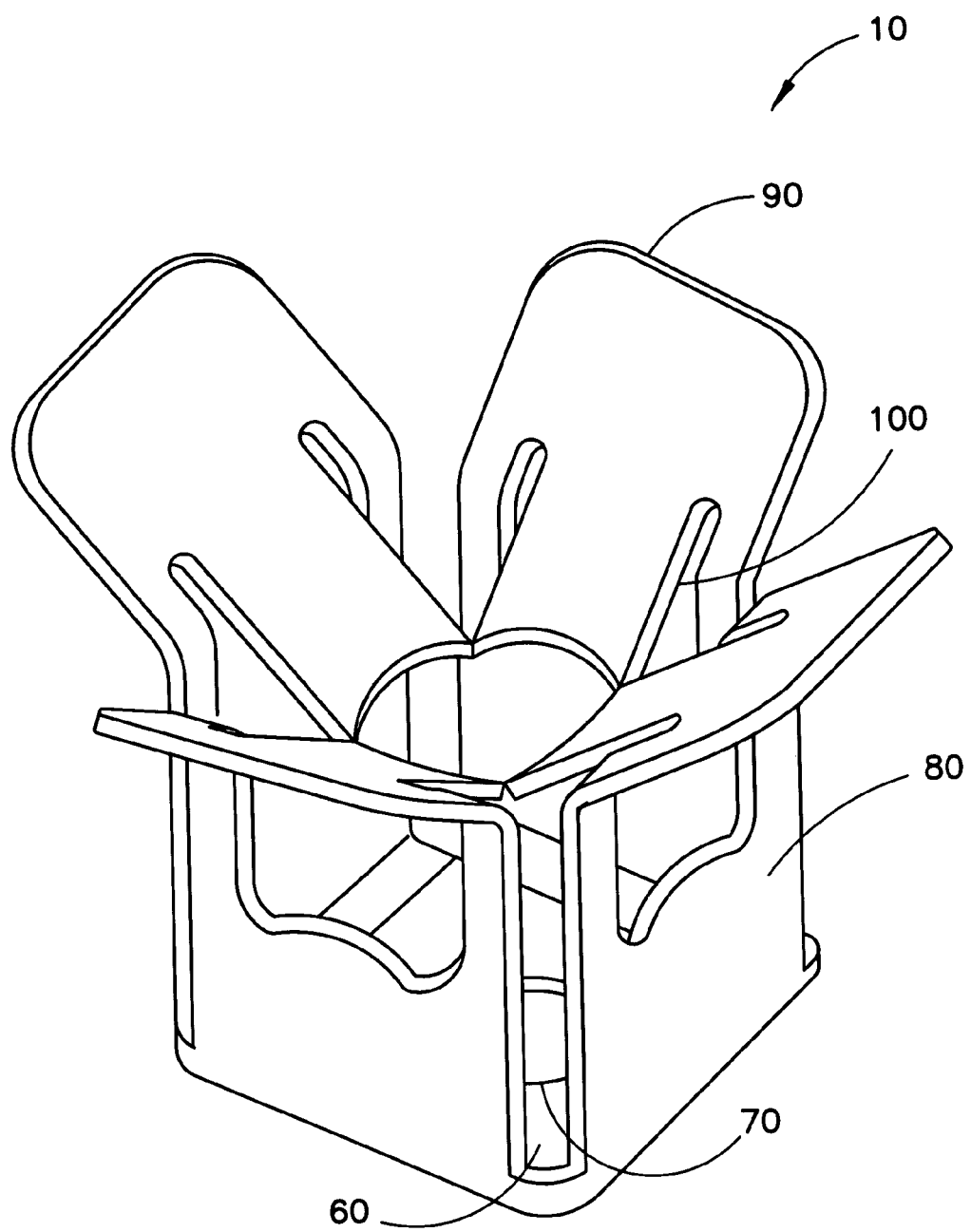
FIG. 1 is a front perspective view of one exemplary embodiment of a stamped ball socket in accordance with the present invention.
Figure 2:
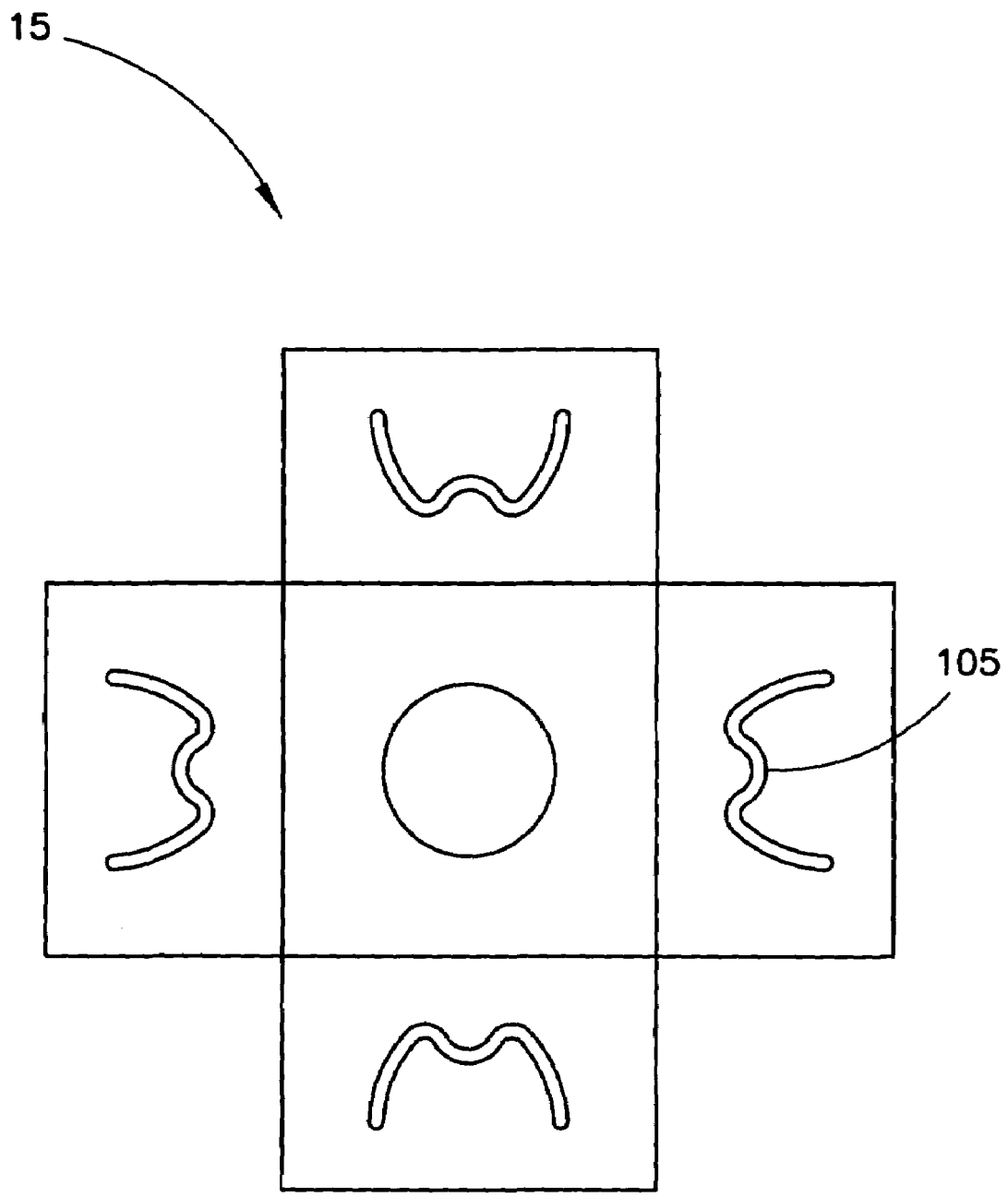
FIG. 2 is a top view of the sheet metal required to form the stamped ball socket of FIG. 1.

FIG. 1 shows one exemplary embodiment of the present invention. As shown in FIG. 1, stamped ball socket 10 is a one-piece stamping of a single flat sheet of metal 15 as depicted in FIG. 2. The present invention may be stamped from any suitable metal known in the art, such as heat-treated spring steel or half-hard RC 32 300 series stainless steel. Stamping the present invention from a metal such as steel provides a stronger socket than current molded sockets known in the art which are often molded of nylon. Molded sockets must be flexed and forced from their mold, limiting the amount of retention force which may be obtained from a molded socket. In addition, sockets molded from nylon are sensitive to heat and moisture which can further reduce the retention force which may be obtained. This is not an issue with metal, such as the steel described above, used for the present invention.

Figure 3:
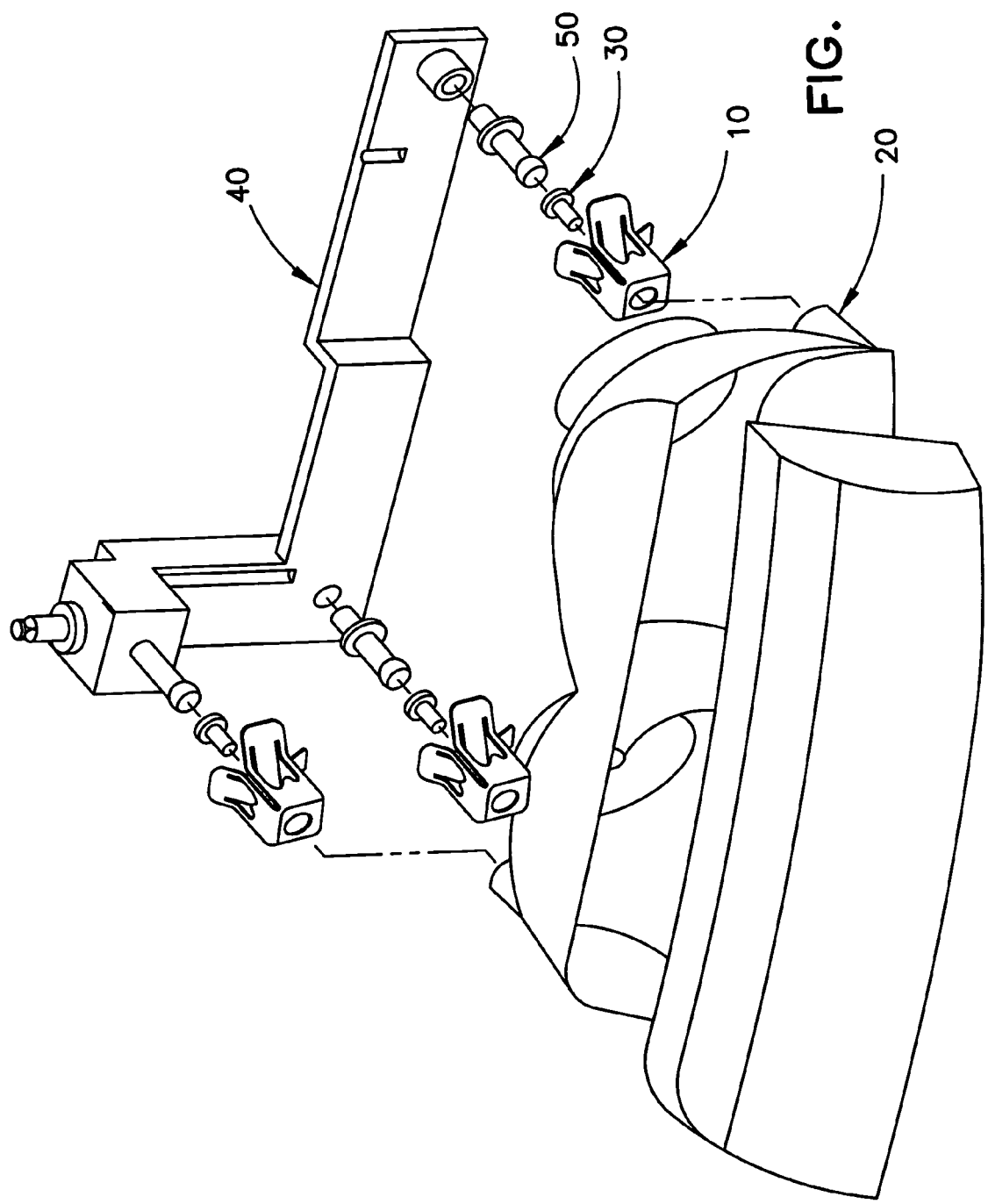
FIG. 3 is a front exploded perspective view of a headlamp assembly employing three stamped ball sockets of FIG. 1.

FIG. 3 shows an exploded view of an assembly utilizing three stamped ball sockets 10 to join headlamp pod 20 to a mounting bracket 40. Headlamp pod 20 may be any headlamp pod known in the art which requires mounting on an automobile (not shown). Mounting bracket 40 may be, for example, any bracket fixed to an automobile for the purpose of supporting a headlamp assembly. Alternatively, mounting bracket 40 may be integrally formed as a support surface on the automobile. In either case, mounting bracket 40 is manufactured with one or more adjuster pivot balls 50 projecting on posts from its surface. As shown in FIG. 3, mounting bracket 40 is shown with three such adjuster pivot balls 50 which snap into three stamped ball sockets 10.

Referring again to FIG. 1, the structure of the first exemplary embodiment of stamped ball socket 10 is shown. In the center of base 60 of stamped ball socket 10 is attachment hole 70 which allows stamped ball socket 10 to be fixedly fastened to headlamp pod 20 using fastener 30, as depicted in FIG. 3. While base 60 may be any one of a variety of shapes, in FIG. 1 base 60 is shown with a square shape. Fastener 30 may be any of a number of frictional or mechanical fasteners known in the art, such as a bolt or screw. As shown in FIG. 3, fastener 30 is an attachment screw. The four walls 80 of stamped ball socket 10 each extend from one of the four sides of base 60. Four walls 80 are only attached on one side to base 60 and are not generally attached to each other. This allows each wall 80 to flex slightly in a direction independent of other walls 80. Distal to base 60, each wall 80 is bent outwards and terminates in angled lead-in tab 90. Lead-in tabs 90 aid in guiding adjuster pivot balls 50 into stamped ball socket 10 during the assembly process.

Extending from four lead-in tabs 90 toward base 60 of stamped ball socket 10 are four lock-in fingers 100 which project into stamped ball socket 10 at the same angle as angled lead-in tabs 90. Lock-in fingers 100 are peninsula-shaped portions of metal that are detached from walls 80 on three sides by the stamping process which stamps out a roughly W-shaped section of metal 105 which is outlined in FIG. 2. The fourth side of each lock-in finger 100 is not cut and is continuous with a corresponding angled lead-in tab 90. The side of each lock-in finger 100 opposite angled lead-in tab 90 is arcuate in shape. Four lock-in fingers 100 extend inward toward base 60 at an angle such that the four arcuate leading edges of lock-in fingers 100 define an opening that is roughly circular in shape. The diameter of the circular opening created by these four arcuate sides is smaller than the diameter of adjuster pivot ball 50.

Along with the head of fastener 30 and four walls 80, lock-in fingers 100 define a ball retaining cavity in stamped ball socket 10. Lock-in fingers 100 serve to lock adjuster pivot ball 50 in place in this ball retaining cavity and provide superior resistance to ball disengagement due to vibration and wear. Lock-in fingers 100 also provide a surface for adjuster pivot ball 50 to swivel against as the headlights are aimed.

In assembly, the present invention allows for adjuster pivot ball 50 to be snapped into stamped ball socket 10 in one assembly motion. Lead-in tabs 90 guide the incoming adjuster pivot ball 50 toward the ball retaining cavity formed in stamped ball socket 10. Adjuster pivot ball 50 is then able to slip past angled lock-in fingers 100 and through the circular opening defined by the arcuate sides of angled lock-in fingers 100. Adjuster pivot ball 50 may be inserted into stamped ball socket 10 using only limited force because of the spring action of the socket's four walls 80. This spring action allows lock-in fingers 100 to flex apart enlarging the circular opening defined by their arcuate sides to accommodate adjuster pivot ball 50. However, once adjuster pivot ball 50 is in stamped ball socket 10, four walls 80 spring back into place and lock-in fingers 100 return to their original position so that the approximately circular opening defined by their arcuate sides becomes too small to allow adjuster pivot ball 50 to be removed. Whereas, upon insertion, the inward force of adjuster pivot ball 50 pushes upon lock-in fingers 100 and flexes four walls 80 outward, the angle of lock-in fingers 100 is such that outward force on adjuster pivot ball 50 does not flex four walls 80 in the same manner and removal of adjuster pivot ball 50 is prevented. In its locked position, adjuster pivot ball 50 is held securely in position by the ends of four lock-in fingers 100 against the head of fastener 30. Additionally, pivot ball 50 is adjustably secured in position so the aiming of the headlamp may be accomplished.

Since stamped ball socket 10 is a single, stamped piece, it does not suffer from the loss of retention force that molded nylon pieces sustain when they are forced off their molds. Instead, lock-in fingers 100 securely hold adjuster pivot ball 50 in place through vibration conditions. Because of stamped ball socket's 10 spring action walls 80 and lead-in tabs 90, the required ball assembly force is also less than current designs when compared at equal retention values. This allows assembly and fixture flexibility.

Figure 4:
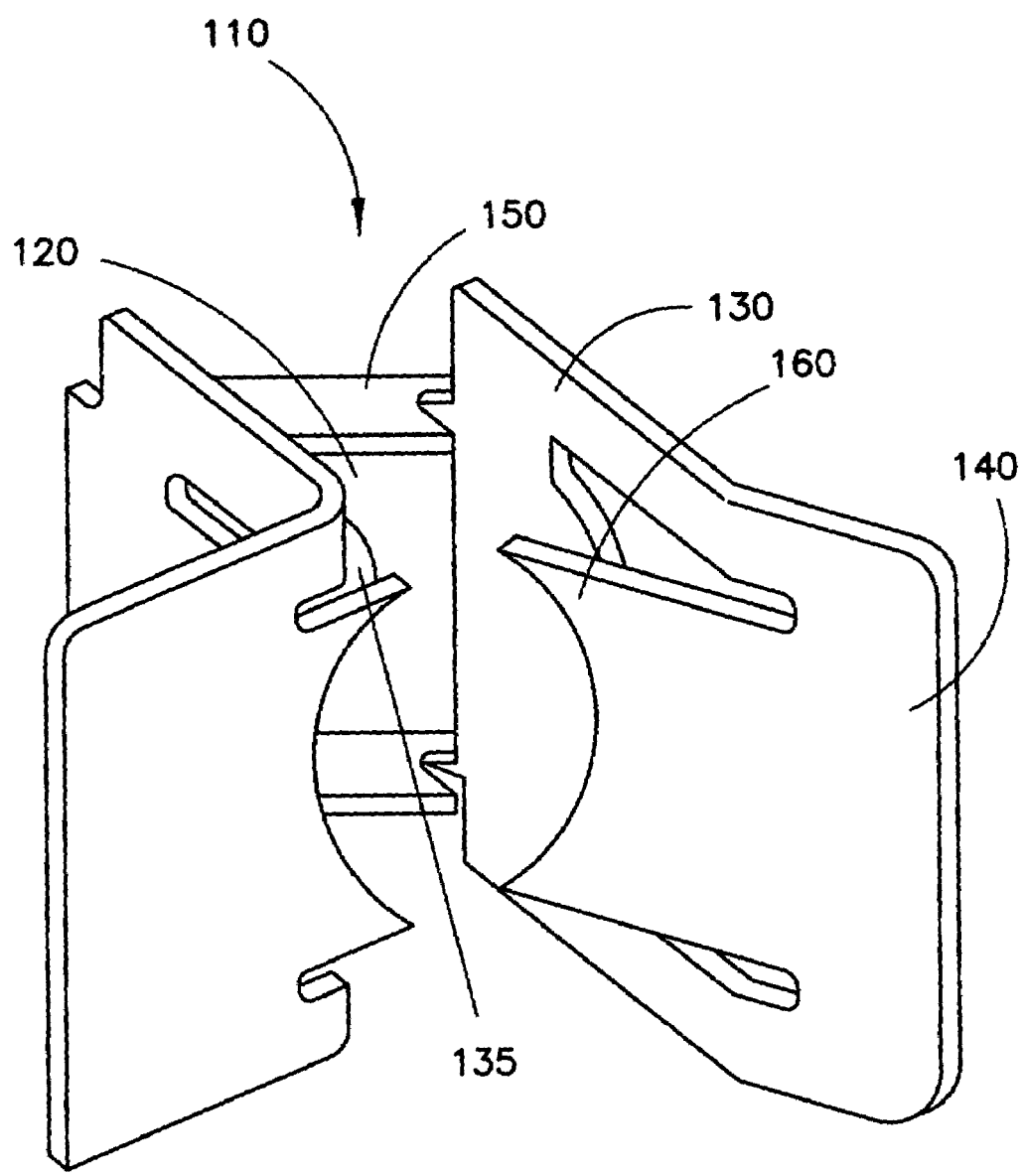
FIG. 4 is a top perspective view of a second exemplary embodiment of a stamped ball socket in accordance with the present invention.
Figure 5:
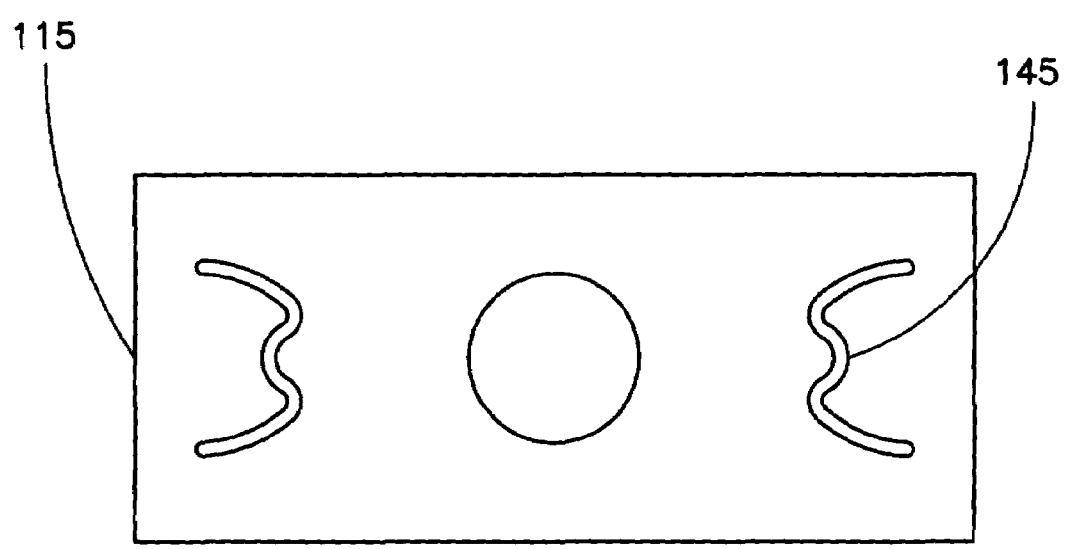
FIG. 5 is a top view of the sheet metal required to form the stamped ball socket of FIG. 4.

FIG. 4 shows a second exemplary embodiment of the present invention, stamped ball socket 110. Similar to the first exemplary embodiment depicted in FIG. 1, stamped ball socket 110 also utilizes a design stamped from a single flat sheet of metal 115, such as heat-treated spring steel or half-hard RC 32 300 series stainless steel. The shape of this single flat sheet of metal 115 is shown in FIG. 5. Also like the first exemplary embodiment, stamped ball socket 110 is configured to join a headlamp pod, such as headlamp pod 20, and a mounting bracket, such as mounting bracket 40, containing a number of adjuster pivot balls 50. As shown in FIG. 4, stamped ball socket 110 has a square-shaped base 120 containing attachment hole 135 which allows for the fastening of stamped ball socket 110 to a headlamp pod using an attachment screw (not shown). Again, while base 120 is shown in FIG. 4 with a square shape, base 120 could be any one of variety of shapes including, for example, circular. Also, as in the earlier described exemplary embodiment, other fasteners, such as a bolt, may be used instead of an attachment screw to allow stamped ball socket 110 to be attached to a headlamp.

Two walls 130 of stamped ball socket 110 each extend from opposite sides of base 120. Two walls 130 are only attached on one side to base 120, allowing each wall 130 to flex slightly. Additionally, unlike in the previous embodiment, walls 130 are wider than base 120 and widen just above base 120. Like the previous embodiment, opposite of base 120, each wall 130 is bent outwards and terminates in an angled lead-in tab 140. Lead-in tabs 140 aid in guiding adjuster pivot ball 50 into stamped ball socket 110 during the assembly process. Extending from the other two sides of base 120 are sidewalls 150. Unlike walls 130, sidewalls 150 are slightly narrower than base 120. Additionally, sidewalls 150 are shorter than walls 130 and serve merely to provide additional sideways restriction on an inserted adjuster pivot ball 50 and to provide some additional stability.

As in the previous embodiment, extending from two lead-in tabs 140 back toward base 120 of stamped ball socket 110 are lock-in fingers 160 which project into stamped ball socket 110 at the same angle as angled lead-in tabs 140. Lock-in fingers 160 are peninsula-shaped portions of metal that are detached from walls 130 on three sides by the stamping process which stamps out a roughly W-shaped section of metal 145 as indicated in FIG. 5. The fourth side of each lock-in finger 160 is not cut and is continuous with a corresponding angled lead-in tab 140. The side of each lock-in finger 160 opposite angled lead-in tab 140 is stamped such that it is arcuate in shape. Both lock-in fingers 160 extend inward toward base 120 at an angle such that the distance between the two arcuate sides of lock-in fingers 160 is less than the diameter of adjuster pivot ball 50. Lock-in fingers 160 serve to lock adjuster pivot ball 50 in place and provide superior resistance to ball disengagement due to vibration and wear than molded ball sockets.

Like the previous embodiment, the present embodiment also allows for adjuster pivot ball 50 to be snapped into stamped ball socket 110 in one assembly motion. Lead-in tabs 140 guide the incoming adjuster pivot ball 50 toward base 120 of the socket. Adjuster pivot ball 50 is then able to slip between the arcuate leading edges of angled lock-in fingers 160. As in the previous embodiment, adjuster pivot ball 50 may be inserted into stamped ball socket 110 using only limited force because of the spring action of the socket's two walls 130. This spring action allows lock-in fingers 160 to flex apart enlarging the distance between their respective arcuate edges to accommodate adjuster pivot ball 50. However, once adjuster pivot ball 50 is engaged in stamped ball socket 110, walls 130 spring back into place and lock-in fingers 160 return to their original position so that the distance between their arcuate sides becomes too small to allow adjuster pivot ball 50 to be removed. Whereas, upon insertion, the inward force of adjuster pivot ball 50 pushes upon lock-in fingers 160 and flexes walls 130. The angle of lock-in fingers 160 is such that outward force on adjuster pivot ball 50 does not flex walls 130 and removal of adjuster pivot ball 50 is prevented.

While in the previous embodiment adjuster pivot ball 50 was tightly held between fastener 30 and the arcuate leading edges of the four lock-in fingers 100, the present embodiment only has two lock-in fingers 160 decreasing the amount of sideways retention on adjuster pivot ball 50. To prevent adjuster pivot ball 50 from disengaging stamped ball socket 110 from either of its two "open" sides, sidewalls 150 provide additional sideways restriction on adjuster pivot ball 50. To accomplish this task while still minimizing the amount of material used in construction of stamped ball socket 110, sidewalls 150 only extend from base 120 to a height approximately even with the center of adjuster pivot ball 50. At this height, adjuster pivot ball 50 is trapped by sidewalls 150, lock-in fingers 160 and fastener 30, and sideways disengagement is prevented.

Additionally, sidewalls 150 work along with lock-in fingers 160 to provide a surface for adjuster pivot ball 50 to swivel against as the headlights are aimed. Alternatively, larger lock-in fingers 160 may be used to provide more sideways retention by wrapping further around pivot ball 50. If lock-in fingers 160 are large enough, then the need for additional sideways retention by sidewalls 150 can be eliminated. In such cases sidewalls 150 can be bent inwards to provide additional retention of the fastener if desired (not shown).

Like the previous embodiment, stamped ball socket 110 is a single, stamped piece, so it does not suffer from the loss of retention force that molded nylon pieces sustain when they are forced off their molds. Additionally, stamped ball socket 110 does not suffer from the disadvantage of sensitivity to heat and moisture which can be a problem for sockets molded from nylon. Instead, lock-in fingers 160 and sidewalls 150 of the present invention securely hold adjuster pivot ball 50 in place through vibration conditions. Because of stamped ball socket's 110 spring action walls 130 and lead-in tabs 140, the required ball assembly force is also less than current designs when compared at equal retention values. It is also worth noting that the two wall design of this second exemplary embodiment requires less metal than the previous embodiment.

Figure 6:
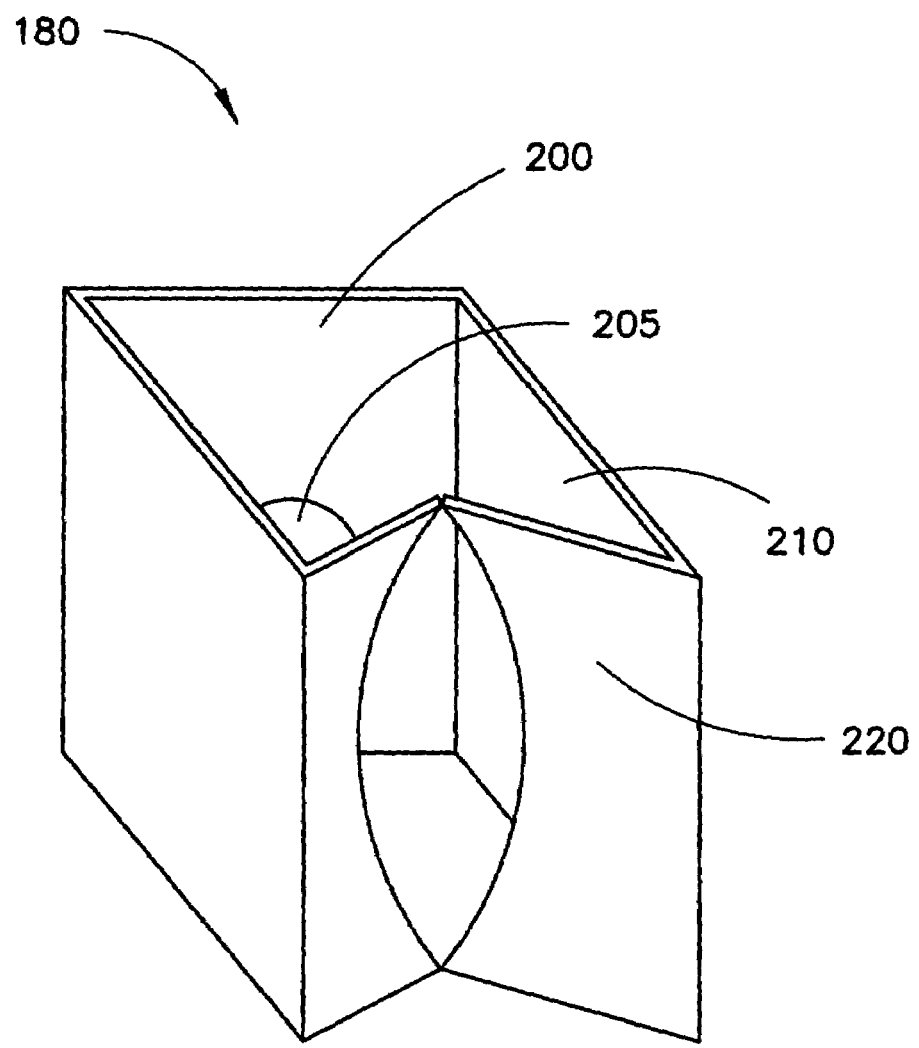
FIG. 6 is a top perspective view of a third exemplary embodiment of a stamped ball socket in accordance with the present invention.
Figure 7:
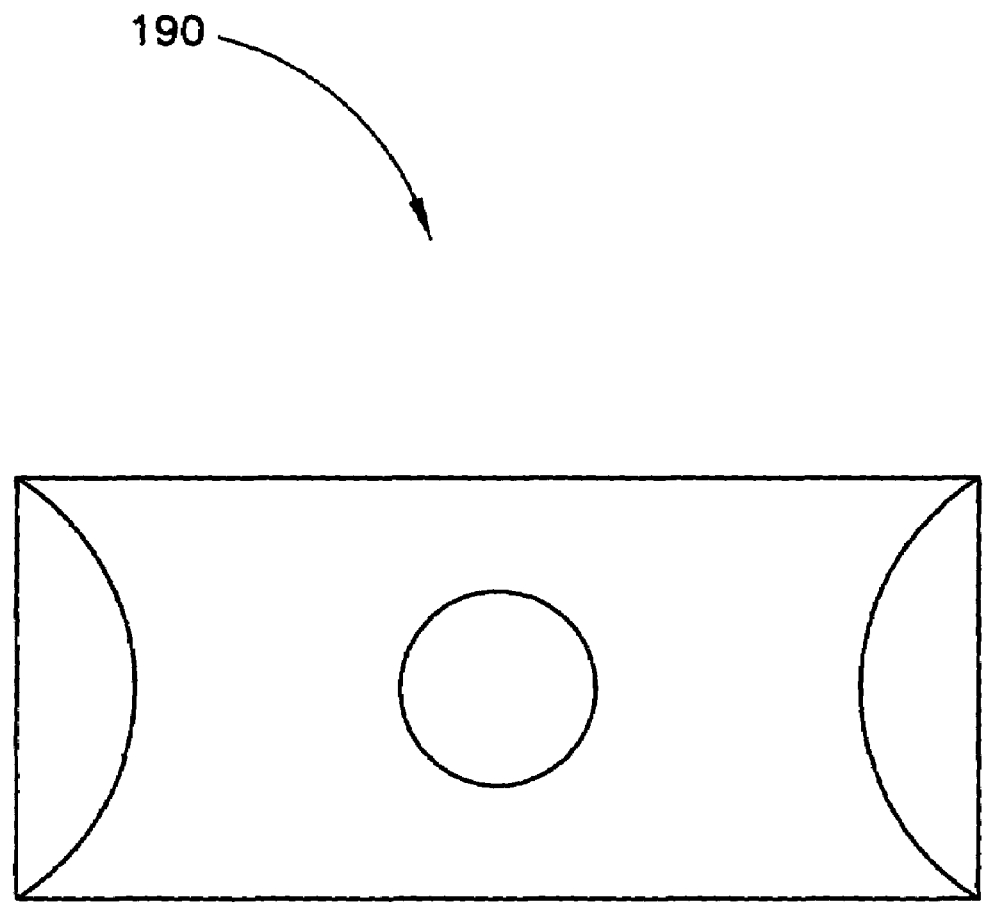
FIG. 7 is a top view of the sheet metal required to form the stamped ball socket of FIG. 6.

FIG. 6 shows a third exemplary embodiment of the present invention, stamped ball socket 180. Like the previously described embodiments, stamped ball socket 180 also utilizes a design stamped from a single flat sheet of metal 190. The shape of this single flat sheet of metal 190 is shown in FIG. 7. Also like the previous embodiments, stamped ball socket 180 is configured to join a headlamp pod, such as headlamp pod 20, and a mounting bracket, such as mounting bracket 40, containing a number of adjuster pivot balls 50. Stamped ball socket 180 has a square-shaped base 200 containing attachment hole 205 which allows for the fastening of stamped ball socket 180 to a headlamp pod using an attachment screw (not shown). Again, base 200 could be of a shape other than square. As in the earlier described embodiments, other fasteners, such as a bolt, may be used instead of an attachment screw to allow stamped ball socket 180 to be attached to a headlamp.

Two walls 210 of stamped ball socket 180 each extend from opposite sides of base 200. Two walls 210 are only attached on one side to base 200, allowing each wall 210 to flex. In the previous two embodiments, a roughly W-shaped piece is stamped out of each wall and each wall is then bent outwards to simultaneously create lead-in tabs and lock-in fingers. Lock-in fingers 220 of the present embodiment are not formed in this manner. Instead, the top of each wall 210 is cut to form an arcuate edge surface. The top of each wall 210 is then folded inward back towards square base 200 to form angled lock-in fingers 220. As in the previous embodiments, the distance between the leading arcuate edges of lock-in fingers 220 is less than the diameter of adjuster pivot ball 50.

The present embodiment also allows for adjuster pivot ball 50 to be snapped into stamped ball socket 180 in one assembly motion. Adjuster pivot ball 50 is manually guided through lock-in fingers 220 toward the base of the socket. Adjuster pivot ball 50 is able to slip between the arcuate leading edges of angled lock-in fingers 220. As in the previous embodiments, adjuster pivot ball 50 may be inserted into stamped ball socket 110 using only limited force because of the spring action of the socket's two walls 210. This spring action allows lock-in fingers 220 to flex apart enlarging the distance between their arcuate edges to accommodate adjuster pivot ball 50. However, once adjuster pivot ball 50 is engaged in stamped ball socket 180, walls 210 spring back into place and lock-in fingers 220 return to their original position so that the distance between their arcuate sides becomes too small to allow adjuster pivot ball 50 to be removed. Whereas, upon insertion, the inward force of adjuster pivot ball 50 pushes upon lock-in fingers 220 and flexes walls 210. The angle of lock-in fingers 220 is such that outward force on adjuster pivot ball 50 does not flex walls 210 and removal of adjuster pivot ball 50 is prevented.

The design of the present embodiment results in wider lock-in fingers 220 which encircle pivot ball 50 and provide both vertical and lateral retention of pivot ball 50. As a result, pivot ball 50 is securely held in place between lock-in fingers 220 and the head of the fastener without the need for additional means of sideways retention. Like the previous embodiments, stamped ball socket 180 is a single, stamped piece, so it does not suffer from the loss of retention force that molded nylon pieces sustain when they are forced off their molds. Additionally, stamped ball socket 180 does not suffer from the disadvantage of sensitivity to heat and moisture which can be a problem for sockets molded from nylon. Instead, lock-in fingers 220 of the present invention securely hold adjuster pivot ball 50 in place through vibration conditions. Additionally, the present exemplary embodiment requires less material than both of the previously described exemplary embodiments.

Three exemplary embodiments of the current invention have been described which pivotably attach a headlamp pod to a mounting bracket having one or more adjuster pivot balls. This is accomplished by attaching the stamped ball sockets to the headlamp pod by utilizing a fastener (shown as an attachment screw) inserted through the attachment hole and into the headlamp pod. The mounting bracket is then attached by inserting the adjuster pivot balls into the stamped ball sockets. However, the present invention may also be utilized to connect a headlamp pod with adjuster pivot balls to a mounting bracket without adjuster pivot balls simply by securing the stamped ball socket to the mounting bracket utilizing a fastener inserted through the attachment hole and then inserting the adjuster pivot balls into the stamped ball sockets to secure the headlamp pod.

While the present invention has been described in detail with reference to certain exemplary embodiments thereof, such is offered by way of non-limiting example of the invention, as other versions are possible. It is anticipated that a variety of other modifications and changes will be apparent to those having ordinary skill in the art and that such modifications and changes are intended to be encompassed within the spirit and scope of the invention as defined by the following claims.

What is claimed is:

1. A single piece stamped ball socket for attaching a headlamp pod to a mounting bracket, the ball socket comprising:
   (a) a single piece of metal having a base and at least two flexing walls, each wall having a plurality of detached sides, a top portion, and a bottom portion integral with said base, such that each wall is only attached to the ball socket by its bottom portion, in order to allow each wall to flex inward and outward; and
   (b) at least two W-shaped, angled lock-in fingers and at least two complementary W-shaped wall apertures, each finger having a portion that is integral with and extends away from one of the top portions of the at least two walls and an end that is bent away from said walls at an acute angle to form a triangular space there between, the end protruding at an angle inward toward said base from said walls, the space extending through the at least two W-shaped wall apertures, each of said lock-in fingers positioned on one of said walls, so that when pressure is exerted on the lock-in fingers during insertion of the ball, said walls flex outward from the base to allow said pivot ball to be inserted between said ends of said lock-in fingers and so that when said pivot ball is fully inserted, the walls spring back to their original position and said pivot ball is adjustably retained in the ball socket by said ends of said lock-in fingers.

2. The ball socket of claim 1 having four walls and four lock-in fingers.

3. The ball socket of claim 1 having four walls and two lock-in fingers.

4. The ball socket of claim 1 having two walls and two lock-in fingers.

5. The ball socket of claim 1 wherein said single piece of metal is heat-treated spring steel.

6. The ball socket of claim 1 wherein said single piece of metal is half-hard RC 32 300 series stainless steel.

7. The ball socket of claim 1 wherein each of said lock-in fingers is formed by stamping a roughly W-shaped section in said single piece of metal.

8. The ball socket of claim 1 further comprising at least two lead-in tabs integral with and protruding outward at an angle from said walls and said lock-in fingers to aid in the insertion of the pivot ball.

9. A single piece stamped ball socket for receiving a ball attached to the end of a post, the ball socket comprising:
   (a) a plurality of walls defining a ball retaining cavity having a bottom and a top;
   (b) a plurality of W-shaped fingers having finger ends and a plurality of complementary W-shaped wall apertures, the plurality of finger ends defining an opening smaller in size than the diameter of the ball and the fingers being integral with the plurality of walls and extending inward toward the bottom of the ball retaining cavity at an acute angle with respect to the plurality of walls forming a triangular space between each finger and each wall, each space extending through one of the plurality of W-shaped apertures; and
   (c) a plurality of angled lead-in tabs, each of the lead-in tabs being adjacent to and integral with one of the plurality of walls and one of the plurality of fingers, and each of the lead-in tabs extending outward and away from the walls, the fingers and the bottom of the ball retaining cavity at an acute angle with respect to the plurality of walls, in order to aid in the insertion of the ball.

10. The ball socket of claim 9 having four walls and four fingers.

11. The ball socket of claim 9 having four walls and two fingers.

12. The ball socket of claim 9 having two walls and two fingers.

13. The ball socket of claim 9, wherein each of said lock-in fingers is formed by stamping a roughly W-shaped section in a single piece of metal.

14. The ball socket of claim 13, wherein said single piece of metal is heat-treated spring steel.

15. The ball socket of claim 13, wherein said single piece of metal is half-hard RC 32 300 series stainless steel.

* * * * *